US006238293B1

(12) United States Patent
Peinemann

(10) Patent No.: US 6,238,293 B1
(45) Date of Patent: May 29, 2001

(54) TORSIONAL VIBRATION DAMPER WITH GUIDE PATHS FOR COUPLING ELEMENTS

(75) Inventor: Bernd Peinemann, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/413,386

(22) Filed: Oct. 6, 1999

(30) Foreign Application Priority Data

Oct. 7, 1998 (DE) ............................................. 198 46 087

(51) Int. Cl.$^7$ .................................. F16F 15/10; F16D 3/12
(52) U.S. Cl. .................................. 464/81; 464/3; 464/137; 74/574
(58) Field of Search ................................. 464/3, 98, 99, 464/93, 161, 104, 137, 138, 81, 180; 192/201; 74/574

(56) References Cited

U.S. PATENT DOCUMENTS

| 1,352,864 | * | 9/1920 | Andrew | 464/137 |
| 1,514,795 | * | 11/1924 | Seymour | 464/137 |
| 2,343,244 | * | 3/1944 | Rose | 464/104 |
| 4,252,227 | * | 2/1981 | Staub, Jr. | 192/106.1 |
| 5,941,134 | * | 8/1999 | Cooke et al. | 464/68 |
| 5,976,020 | * | 11/1999 | Lohaus et al. | 464/3 |
| 6,067,876 | * | 5/2000 | Lohaus | 74/574 |
| 6,109,134 | * | 8/2000 | Sudau | 464/81 |
| 6,128,972 | * | 10/2000 | Cooke et al. | 464/68 |

FOREIGN PATENT DOCUMENTS

| 197 26 532 A1 | 3/1998 | (DE) | F16F/15/14 |

* cited by examiner

*Primary Examiner*—Lynne H. Browne
*Assistant Examiner*—Kenn Thompson
(74) *Attorney, Agent, or Firm*—Cohen, Pontani, Lieberman & Pavane

(57) ABSTRACT

A torsional vibration damper has a drive-side damper element and a driven-side damper element which is rotatable relative to the drive-side element against the action of a damping device, wherein the damping device serves to transmit torque between the two damper elements and has a plurality of coupling bodies, each of which is received in at least one guide path of each damper element, and, during a relative movement of the damper elements with respect to one another, undergoes a deflection in at least one of its guide paths. Guide paths which extend farther in the circumferential direction than in the radial direction and guide paths which extend farther in the radial direction than in the circumferential direction are provided. A succession of guide paths for the coupling bodies is realized in the circumferential direction in at least one of the damper elements, wherein at least one guide path extending farther in the radial direction is adjacent to at least some of the guide paths extending farther in the circumferential direction.

6 Claims, 3 Drawing Sheets

TORSIONAL VIBRATION DAMPER WITH GUIDE PATHS FOR COUPLING ELEMENTS

BACKGROUND OF THE INVENTION

1. Field of the Invention

The present invention is directed to a torsional vibration damper with a drive-side damper element and a driven-side damper element that is rotatable relative to the drive-side damper element against the action of a damping element.

2. Description of the Related Art

A prior art torsional vibration damper is disclosed in German reference DE 197 26 532 A1 with a drive-side damper element and a driven-side damper element. The driven-side damper element is rotatable relative to the drive-side element against the action of a damping device. The damping device transmits torque between the two damper elements and has a plurality of coupling bodies, each of which is received in at least one guide path of the drive-side damper element and in at least one guide path of the driven-side damper element. The coupling body comprises an outer circumference which engages one of the guide paths and a bearing neck which engages the other respective guide path. As is shown especially clearly in FIGS. 3, 10 or 12 of the prior art reference, all of the guide paths extend in each of the damper elements in a comparable manner. For example, in one damper element the guide paths are curved in an essentially semicircular manner at least in their radial outer rolling area for the coupling body and in the other damper element the guide paths extend substantially radially. The semicircular curved guide paths are constructed so as to extend farther in the circumferential direction than in the radial direction, while the other guide paths are constructed so as to extend farther in the radial direction than in the circumferential direction. The following problem results from this prior art arrangement:

FIGS. 10 and 12 of the prior art reference show that only very slender webs remain between every two guide paths in all guide paths which are constructed so as to extend farther in the circumferential direction in a damper element. This problem occurs even when the quantity of guide paths in the circumferential direction is limited to a comparatively small number. However, the minimum width of these webs must be dimensioned such that the loads occurring on the damper element, e.g., shearing loads or bending loads, are withstood. At the same time, the extension of the guide paths in the circumferential direction is determined by the desired amount of deflection of the damper elements relative to one another. Accordingly, the quantity of coupling bodies to be received in this damper element is necessarily limited to a comparatively small number. It is precisely these coupling bodies that carry out the transmission of torque between the damper elements. Since a greater number of these coupling bodies is required to transmit high torques, the performance threshold of this type of prior art torsional vibration damper is relatively low. In the other damper element in which the guide paths run essentially radially, the webs between every two guide paths viewed in the circumferential direction are relatively very wide, especially when the guide paths which extend farther in the radial direction are to be provided for receiving the bearing necks of the coupling bodies which are often constructed with a smaller diameter than the outer circumference of the coupling bodies.

SUMMARY OF THE INVENTION

It is the object of the invention to provide a torsional vibration damper having coupling bodies arranged between damper elements for transmitting torque between the damper elements such that the highest possible torque can be transmitted and such that every damper element comprises a sufficient stability.

This object is met according to the invention by a torsional vibration damper, comprising a drive-side damper element rotatable about an axis of rotation and having a plurality of drive-side guide paths, said plurality of drive-side guide paths comprising first drive-side guide paths and second drive-side guide paths, a driven-side damper element rotatable relative to said drive-side element about said axis of rotation and having a plurality of driven-side guide paths, said plurality of driven-side guide paths comprising first driven-side guide paths and second driven-side guide paths, wherein said first drive-side guide paths and said first driven-side guide paths comprise first guide paths extending farther in the circumferential direction than in the radial direction and said second drive-side guide paths and said second drive-side guide paths comprises second guide paths extending farther in a radial direction that in the circumferential direction, and a damping device arranged between said drive-side damper element and said driven-side damper element for transmitting torque between said drive side damper element and said driven-side damper element such that said driven-side damper element is rotatable relative to said drive-side damper element against an action of said damping device, said damping device comprising a plurality of coupling bodies, at least one of said plural coupling bodies being received one of said first guide paths and one of said second guide paths, wherein said coupling body undergoes a deflection in at least one of said first guide path and said second guide path during a relative movement between the drive-side damper element and the driven-side damper element, wherein at least one of said plurality of drive-side guide paths and said plurality of driven side guide paths is arranged in a succession in which one of said first guide paths is arranged circumferentially adjacent to one of said second guide paths.

As a result of the construction of the damper elements with a succession of guide paths for the coupling bodies in the circumferential direction in which at least one guide path extending farther in the radial direction is adjacent to at least some of the guide paths extending farther in the circumferential direction, a greater number of guide paths can be realized in every damper element. Because at least one coupling body is associated with every guide path of a damper element, the increased number of guide paths allow the damper elements to be loaded by a greater number of coupling bodies. Accordingly the mass introduced via the coupling bodies is considerably increased compared with the construction according to the prior art and it is therefore possible to transmit higher torques. In this respect, it is particularly advantageous when every guide path in a damper element extending farther in the circumferential direction is adjoined on both sides by a guide path extending farther in the radial direction and each of the latter guide paths is in turn adjoined on both sides by a guide path extending farther in the circumferential direction. In this way, a very dense loading of every damper element with guide paths and therefore with coupling bodies is achieved. The web width between every two of these guide paths is sufficiently large in the circumferential direction in all of the damper elements, so that every damper element is capable of supplying the desired minimum stability relative to the occurring loads.

As an alternative to the particularly advantageous solution described above, two guide paths extending farther in the radial direction may be provided between every two guide paths extending farther in the circumferential direction. An individual guide path extending farther in the circumferential direction may be associated with these two guide paths extending farther in the radial direction at the other respective damper element so that two coupling bodies are inserted in the individual guide path extending farther in the circumferential direction. Each of the two coupling bodies engages in the radial direction in one of the guide paths extending farther in the radial direction. In this embodiment, the quantity of coupling bodies in the torsional vibration damper can be considerably increased whereby a plurality of coupling bodies are used for every guide path extending farther in the circumferential direction which results in the ability to transmit increased torques. In addition, there results the additional advantage that the stiffness characteristic of the damping device in the torsional vibration damper can be distinctly influenced. This is because when the damper elements rotate relative to one another the coupling body located in front in the rotating direction is forced inward radially, for example, by the guide path extending farther in the circumferential direction, and the stiffness of the damping devices is accordingly increased, while the rear coupling body, for example, in an area of the guide path extending farther in the circumferential direction, is in a position in which it initially moves radially outward until it reaches the vertex of the curved guide path. Until it reaches this vertex, the behavior of the rear coupling body with respect to stiffness is regressive and stiffness decreases, whereas when the damper elements continue their rotation relative to one another, this rear coupling body as well as the front coupling body considered in the rotating direction moves radially inward, so that the stiffness in the damping device increases to a disproportionately great extent until the front coupling body considered in the rotating direction arrives at the end of the guide path.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1a is a detailed view of area A showing another embodiment according to the present invention;

DETAILED DESCRIPTION OF THE PRESENTLY PREFERRED EMBODIMENTS

Figure 1:
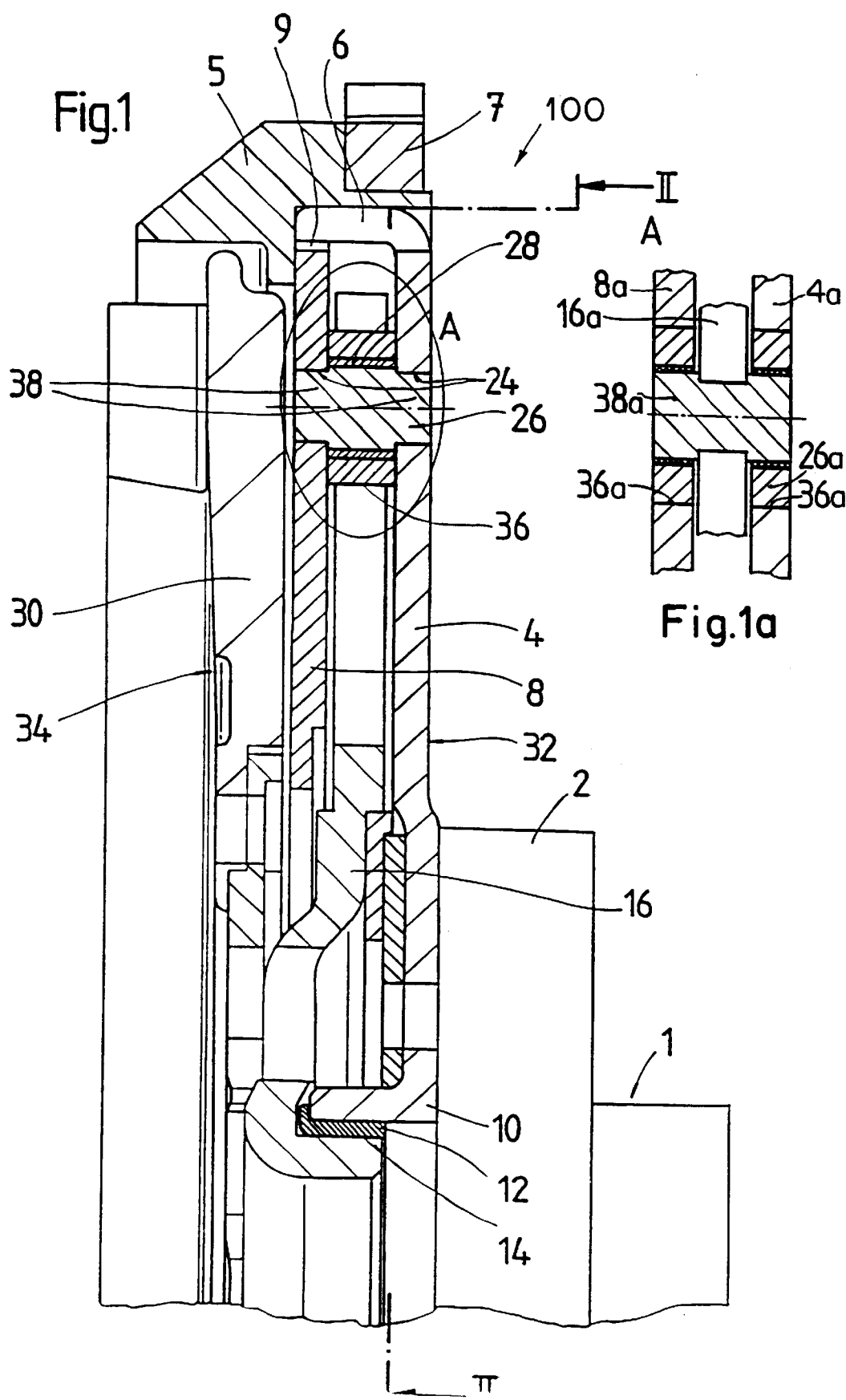
FIG. 1 is a longitudinal sectional view through an upper half of a torsional vibration damper with coupling bodies received in at least one guide path of a damper element and with bearing necks of a coupling body inserted in at least one guide path of another damper element according to an embodiment of the present invention.
Figure 2:
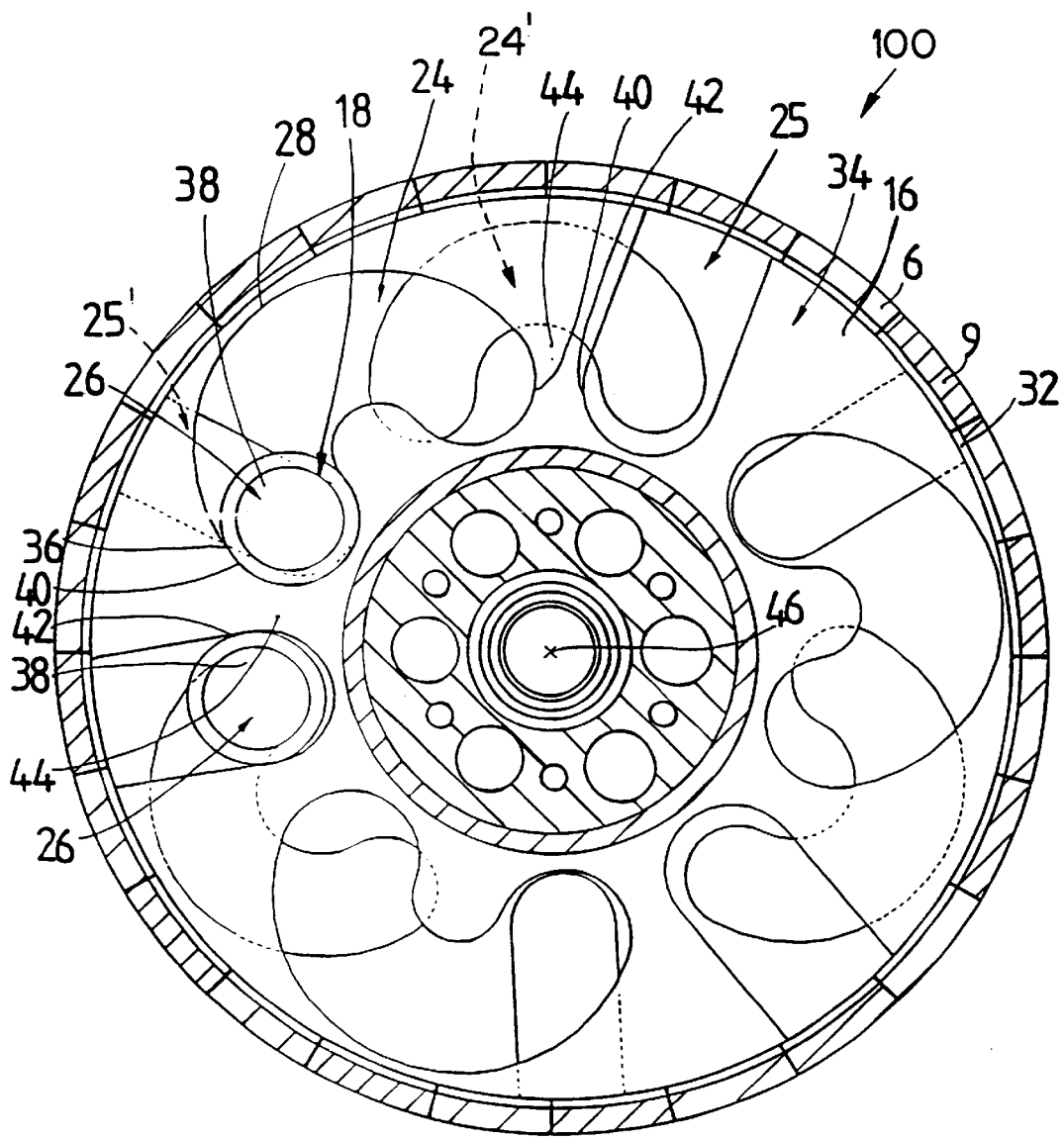
FIG. 2 is a cross-sectional view of the torsional vibration damper along line II—II in FIG. 1.

A torsional vibration damper 100 in the form of a dual-mass flywheel is shown schematically in FIGS. 1 and 2 according to an embodiment of the present invention. The torsional vibration damper 100 includes a primary flange 4 which extends radially outward and is fastened via a connection, not shown, to a drive 1 in the form of a crankshaft 2. A radial outer area of the primary flange 4 has bent portions 6 distributed along the circumferential direction and extending in a direction facing away from the crankshaft 2. A cover plate 8 includes bent portions 9 which extend toward the crankshaft 2 and which communicate without play in the circumferential direction with the bent portions 6 of the primary flange 4. A flywheel mass 5 that axially connecting the primary flange 4 with the cover pate 8 is pressed on the primary flange 4 and the cover plate 8 on an outer circumferential area. The flywheel mass 5 carries a ring gear 7 which engages with the teeth of a starter pinion, not shown. The primary flange 4, cover plate 8 and flywheel mass 5 form a drive-side damper element 32 of the torsional vibration damper 100.

A hub disk 16 arranged axially between the primary flange 4 and the cover plate 8 has a secondary hub 14 connected at a radial inner end of the hub disk 16 which extends axially toward the crankshaft 2 and which is enclosed radially by a bearing 12. A primary hub 10 at a radial inner circumference of the primary flange 4 guides the bearing 12 and extends toward the hub disk 16. A flywheel mass 30 is connected to the hub disk 16 by a connection which is not shown. The flywheel mass 30 and the hub disk 16 act as a driven-side damper element 34 of the torsional vibration damper 100. The hub disk 16 is centered relative to the drive-side damper element 32 by the bearing 12.

The hub disk 16 viewed more clearly in FIG. 2 in which it is shown along a section II—II illustrated in FIG. 1. The hub disk 16 is constructed with first and second driven-side guide paths 24, 25 which are alternately distributed in a uniform arrangement along a circumferential direction on the hub disk 16. First and second drive-side guide paths 24', 25' in the cover plate 8 are also shown in dotted lines indicating that they are behind the hub disk 16. A coupling body 26 having an outer circumference 36 and a bearing neck 38 (see FIG. 1) is movably received in each of the first and second driven-side guide paths 24, 25 and first and second drive-side guide paths 24', 25'. The first driven-side guide path 24 and the first drive-side guide path 24' are constructed so as to have a greater extension in the circumferential direction than in the radial direction while the second driven-side guide path 25 and the second drive-side guide path 25' extend substantially radially and accordingly have a greater extension in the radial direction than in the circumferential direction. The first driven-side guide path 24, for example, in the hub disk 16 shown in FIG. 2, is constructed such that the coupling body 26 arranged by its outer circumference 36 in the first driven-side guide path 24 is capable of movement along the extension of the first driven-side guide path 24, but is received virtually without play in the direction perpendicular to this extension. The bearing neck 38 projecting out on both sides of the coupling body 26 is guided in a second drive-side guide path 25' in the cover plate 8 as well as in the primary flange 4, namely, in such a way that movements of the bearing neck 38 are permitted in the radial direction, while the bearing neck 38 is received in the second drive-side guide path 25' virtually without play in the circumferential direction.

In the driven-side damper element 34, the second driven-side guide paths 25 are formed adjacent to both circumferential sides 40, 42 of the first driven-side guide path 24. The outer circumference 36 of the coupling body 26 is received in this second driven-side guide path 25 so as to be substantially radially movable. However, in the drive-side damper element 32, in both the primary flange 4 and the cover plate 8 in this case, a first drive-side guide path 24' which receives the bearing neck 38 of the respective coupling body 26, specifically for movements with a substantial component in the circumferential direction, is associated with the respective second driven-side guide path 25 of the driven-side damper element 34.

Each of the drive-side and driver-side damper elements 32, 34, a succession of first and second driven-side guide paths 24, 25 or first and second drive-side guide paths 24', 25' is arranged in the circumferential direction in which a second driven-side guide path 25 adjoins at both circumferential sides of a first driven-side guide path 24. Likewise, a first driven-side guide path 24 adjoins on both circumferential sides of each second driven-side guide path 25. The first and second drive-side guide paths 24', 25' are arranged in a similar arrangement. Consequently, there is optimum utilization with first and second guide paths 24, 25, (24', 25') in each of the drive-side and driver-side damper elements 32, 34 without excessively limiting the width of the webs 44 between every two adjacent first and second guide paths 24(24') and 25(25'). The succession of first and second driven-side guide paths 24, 25 is provided with an angular offset relative to the succession of first and second drive-side guide paths 24', 25' about a common axis of rotation 46 (FIG. 2). With respect to the webs 44, their narrowest point in the construction according to FIG. 2 is between a side 40 of a first driven-side guide path 24 and a side 42 of a second driven-side guide path 25.

In the construction shown in FIG. 2, the coupling bodies 26 are guided by their outer circumference 36 in the first and second driven-side guide paths 24, 25 of the hub disk 16, while the bearing neck 38 engages in the corresponding first and second drive-side guide paths 24', 25' in the primary flange 4 as well as in the cover plate 8. Referring to FIG. 1a, the hub disk 16a, primary flange 4a, and cover plate 8a are construed so that the bearing neck 38a is received in the guide paths of the hub disk 16a, while the coupling body 26a is received by its outer circumference 36a in the guide paths of the primary flange 4a and the cover plate 8a. This alternative embodiment is shown in FIG. 1a.

In another alternate embodiment, it is possible to alternate the construction of the coupling bodies 26, 26a, so that one coupling body 26 can be constructed according to the embodiment of FIG. 1 and the two adjacent coupling bodies 26a can be constructed according to the embodiment of FIG. 1a. Accordingly, the density of coupling bodies 26, 26' loading the torsional vibration damper can be further increased where appropriate, wherein these coupling bodies 26, 26a are part of a damping device 18.

Figure 3:
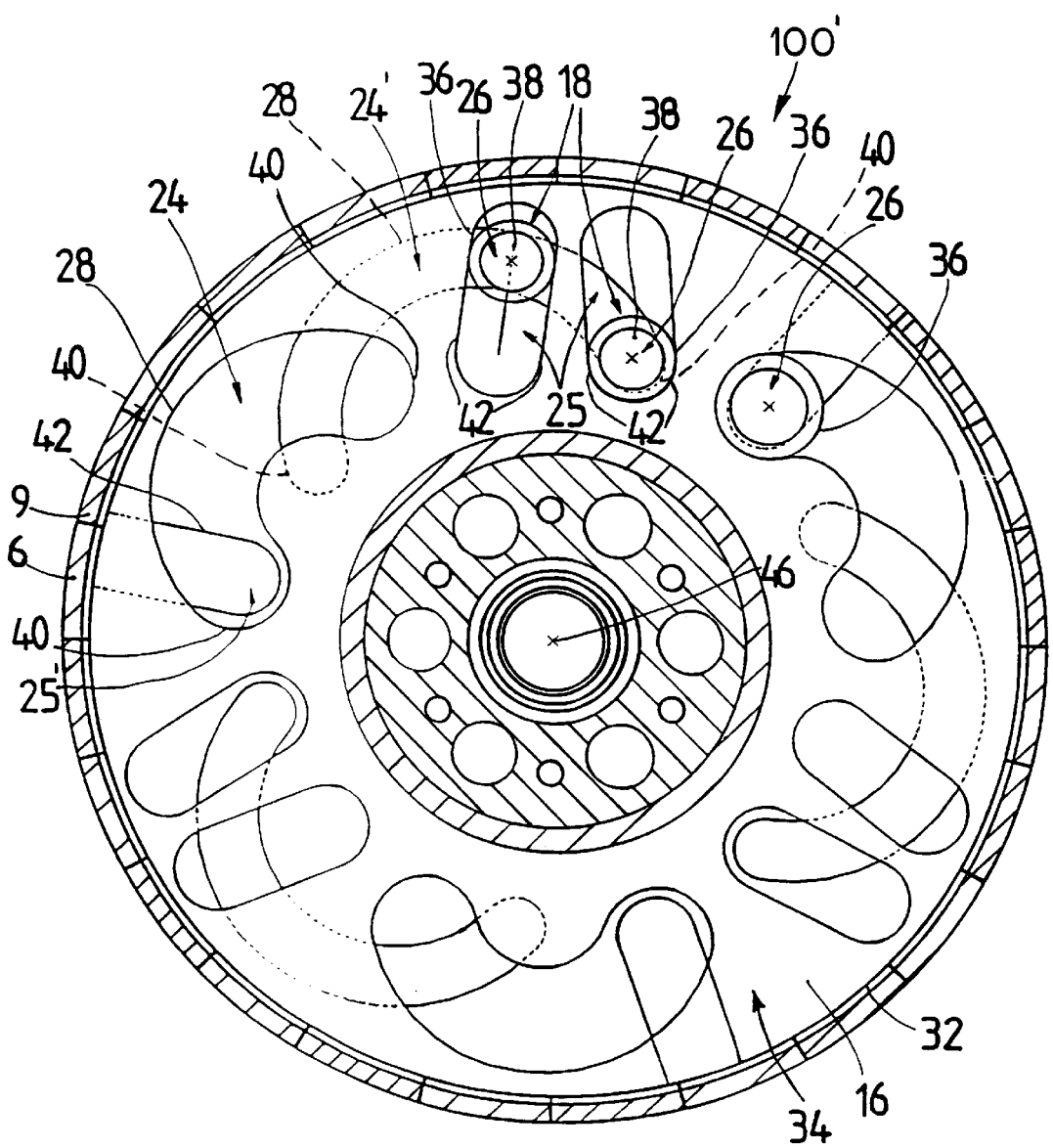
FIG. 3 is a sectional view of a further embodiment of a torsional vibration damper according to another embodiment of the present invention in which two coupling bodies are arranged in one guide path.

FIG. 3 shows another embodiment of a torsional vibration damper 100' according to the invention in which some of the first driven side guide paths 24 or drive-side guide paths 24' receive two coupling bodies 26 at an angular offset relative to the axis of rotation 46. The first drive-side guide paths 24' are shown by dashed lines in FIG. 3. The dashed line indicates that they are located behind the section line II—II in FIG. 1 and, therefore, in the cover plate 8. On the other hand, two second driven-side guide paths 25 lying adjacent to one another in the circumferential direction are provided in the hub disk 16 located axially in front of the cover plate 8. Each of these two second driven-side guide paths 25 guides a coupling body 26 by its outer circumference 36. However, both of the bearing necks 38 of the coupling bodies 26, are received in the first drive-side guide path 24'. The function of the damping device 18 according to FIG. 3 would likewise be ensured if the two coupling bodies 26 were received in a first driven side guide path 24 by their outer circumference 36 and the bearing necks 38 were received in second drive-side guide paths 25'. The first driven-side guide paths 24 receiving two coupling bodies 26 could also be arranged in the hub disk 16, while the associated second driven-side guide paths 25 are incorporated in the primary flange 4 and cover plate 8. According to FIG. 3, only the first driven-side guide paths 24 are provided with two coupling bodies 26, while the remainder of the first drive-side guide paths 24' are outfitted with only one coupling body 26. However, all first drive-side guide paths 24' may also be constructed such that they receive two or more coupling bodies 26.

The function of the coupling bodies 26 during transmission of torque from the drive-side damper element 32 to the driven-side damper element 34 has already been described in the above-cited DE 197 26 532 A1, so that no additional explanation seems required herein. However, it is very important to note that the present embodiment form of the torsional vibration damper permits the transmission of very high torques because of the large number of coupling bodies 26, 26' between the drive-side and driven-side damper elements 32, 34. Another positive result of the construction according to FIG. 3 in which a plurality of coupling bodies 26 is arranged in one of the first guide paths 24 is the following: The first driven-side guide paths 24 and first drive-side guide paths 24' are curved symmetric to the axis of rotation 46. As a result, the two coupling bodies 26 may be arranged so that they occupy different radial positions relative to one another in the two second guide paths 25 extending farther in the radial direction in the absence of deflection of the two damper elements 32, 34. During a relative deflection of the damper elements 32, 34, the coupling body 26 lying in front in the direction of rotation moves radially inward and accordingly increases the stiffness of the damping device 18 because this movement is carried out against the centrifugal force acting about the axis of rotation 46 during the rotation of the torsional vibration damper. However, the rear coupling body 26 in the direction of rotation, insofar as it is not located on the other side of the vertex 28 of the first driven-side guide path 24 or first drive-side guide path 24', moves radially outward until it has reached the vertex 28 of this first driven-side guide path 24 or first drive-side guide path 24'. Before reaching the vertex 28, the action of the rear coupling body 26 is regressive with respect to the stiffness of the damping device 18, i.e., it reduces the stiffness. As soon as the rear coupling body 26, considered in the direction of rotation, has moved past the vertex 28 along the first driven-side guide path 24 or first drive-side guide path 24', this rear coupling body 26 is also forced radially inward along guide path 26 against the action of centrifugal force, whereupon the stiffness of the damping device 18 increases sharply and reaches its maximum when the front coupling body 26, considered in the rotating direction, has reached the side 40 of the first guide path 24 neighboring in the circumferential direction. This is the state of operation shown in FIG. 3. The characteristic of the damping device 18 is therefore changed from very soft to very hard over a large adjusting area. The two second drive-side guide paths 25' extending farther in the radial direction are inclined relative to one another in the radial outer area so that the rear coupling body 26 considered in the rotating direction can move radially inward as far as possible at this maximum deflection.

By a combination of the first guide paths 24 according to FIG. 3 in which one coupling body 26 is received in some cases and two coupling bodies 26 are received in other cases, the installation space in the circumferential direction is utilized to an optimum degree, the width of the webs 44 between two respective guide paths 24, 25 can be dimensioned in an optimum manner corresponding to load, and the characteristic can be adapted in a very sensitive manner to the requirements of the torsional vibration damper.

The invention is not limited by the embodiments described above which are presented as examples only but can be modified in various ways within the scope of protection defined by the appended patent claims.

I claim:

1. A torsional vibration damper, comprising a drive-side damper element rotatable about an axis of rotation and having a plurality of drive-side guide paths, said plurality of drive-side guide paths comprising first drive-side guide paths and second drive-side guide paths;

a driven-side damper element rotatable relative to said drive-side element about said axis of rotation and having a plurality of driven-side guide paths, said plurality of driven-side guide paths comprising first driven-side guide paths and second driven-side guide paths, wherein said first drive-side guide paths and said first driven-side guide paths comprise first guide paths extending farther in the circumferential direction than in the radial direction and said second drive-side guide paths and said second driven-side guide paths comprises second guide paths extending farther in a radial direction that in the circumferential direction; and a damping device arranged between said drive-side damper element and said driven-side damper element for transmitting torque between said drive side damper element and said driven-side damper element such that said driven-side damper element is rotatable relative to said drive-side damper element against an action of said damping device, said damping device comprising a plurality of coupling bodies, at least one of said plural coupling bodies being received one of said first guide paths and one of said second guide paths, wherein said coupling body undergoes a deflection in at least one of said first guide path and said second guide path during a relative movement between the drive-side damper element and the driven-side damper element, wherein at least one of said plurality of drive-side guide paths and said plurality of driven-side guide paths is arranged in a succession in which one of said first guide paths is arranged circumferentially adjacent to one of said second guide paths.

2. The torsional vibration damper of claim 1, wherein at least one of said second guide paths neighbors at least one circumferential side of each of said first guide paths in said succession of said plurality of guide paths.

3. The torsional vibration damper of claim 2, wherein at least one of said second guide paths is adjacent to every one of said first guide paths on both sides along the circumferential direction in said succession of said plurality of guide paths.

4. The torsional vibration damper of claim 1, wherein at least one of said first guide paths is adjacent on at least one circumferential side of each of said second guide paths in said succession of said plurality of guide paths.

5. The torsional vibration damper of claim 4, wherein at least one of said first guide paths is arranged adjacent both circumferential sides of every one of said second guide paths in said succession of said plurality of guide paths.

6. The torsional vibration damper of claim 1, wherein at least two of said plurality of coupling bodies are received at an angular offset to one another in one of said first guide paths.

* * * * *